United States Patent
Lacour et al.

(10) Patent No.: US 9,091,372 B2
(45) Date of Patent: Jul. 28, 2015

(54) PIPE HANGER ASSEMBLY

(76) Inventors: Donna E. Lacour, Kenner, LA (US); Alexander John Ellsworth, Metairie, LA (US)

(*) Notice: Subject to any disclaimer, the term of this patent is extended or adjusted under 35 U.S.C. 154(b) by 568 days.

(21) Appl. No.: 13/317,554

(22) Filed: Oct. 21, 2011

(65) Prior Publication Data

US 2013/0099068 A1    Apr. 25, 2013

(51) Int. Cl.
| E21F 17/02 | (2006.01) |
| F16L 3/00 | (2006.01) |
| F16L 3/133 | (2006.01) |
| F16B 13/06 | (2006.01) |

(52) U.S. Cl.
CPC .............. *F16L 3/133* (2013.01); *F16B 13/065* (2013.01); *Y10T 29/49826* (2015.01)

(58) Field of Classification Search
CPC .............. F16L 3/133; F16L 3/14; F16L 3/11; F16B 13/065; Y10T 29/49826; E04G 21/195; E04B 1/4157; E04C 5/122
USPC ..................... 248/62, 58, 61, 59; 411/2, 5, 34; 52/745.21, 745.05, 704, 699, 698
See application file for complete search history.

(56) References Cited

U.S. PATENT DOCUMENTS

| 1,362,244 | A |  | 12/1920 | Farley | |
|---|---|---|---|---|---|
| 1,837,930 | A | * | 12/1931 | Waite | 248/58 |
| 1,940,545 | A | * | 12/1933 | Holmes | 52/699 |
| 2,156,639 | A |  | 10/1936 | Powell | |
| 3,094,304 | A | * | 6/1963 | Linder, Jr. | 248/211 |
| 3,201,906 | A | * | 8/1965 | Giardina | 52/39 |
| 3,493,206 | A | * | 2/1970 | Albro | 248/59 |
| 3,514,917 | A | * | 6/1970 | Merrill, Sr. | 52/704 |
| 3,769,774 | A | * | 11/1973 | Barnes | 52/698 |
| 3,856,247 | A | * | 12/1974 | Keighley | 410/77 |
| 3,866,871 | A | * | 2/1975 | Dupuy, Sr. | 248/59 |
| 4,211,048 | A | * | 7/1980 | Naka | 52/700 |
| 4,765,577 | A |  | 8/1988 | Collins et al. | |
| 4,793,578 | A | * | 12/1988 | Howard | 248/62 |
| 5,219,427 | A |  | 6/1993 | Harris | |
| 5,295,647 | A | * | 3/1994 | Weidler | 248/62 |
| 5,702,077 | A | * | 12/1997 | Heath | 248/59 |
| 6,240,697 | B1 | * | 6/2001 | Thompson et al. | 52/698 |
| 7,325,776 | B2 | * | 2/2008 | Shibuya | 248/62 |
| 7,871,045 | B2 | * | 1/2011 | Moore et al. | 248/62 |
| 8,201,381 | B2 | * | 6/2012 | Heath | 52/745.21 |
| 2007/0028557 | A1 | * | 2/2007 | Kelly et al. | 52/741.15 |
| 2012/0201625 | A1 | * | 8/2012 | Ikuno | 411/5 |

* cited by examiner

*Primary Examiner* — Anita M King
(74) *Attorney, Agent, or Firm* — Keaty Law Firm LLC

(57) ABSTRACT

A pipe hanger for supporting a pipe below an overhead support, such as a slab foundation, is disclosed. A plurality of grooves is formed in the bottom of the slab foundation. A conical wedge is frictionally engaged with each groove to secure a first threaded suspension rod to the slab foundation. A second threaded J-shaped suspension rod is operationally connected to the first suspension rod through a connector plate, in relation to which the suspension rods can axially rotate. A pipe engaging loop is connected to the second suspension rod. The pipe engaging loop can be adjusted vertically and horizontally to accommodate natural position of the pipe.

11 Claims, 4 Drawing Sheets

PIPE HANGER ASSEMBLY

BACKGROUND OF THE INVENTION

The present invention relates to pipe hangers for suspending a pipe from an overhead support, and more particularly to a pipe hanger that is configured for suspending a pipe beneath slab foundations of concrete and reinforced steel construction.

In the construction of homes, office buildings and other such structures, it was and still is common to use a foundation of reinforced concrete prior to construction of the building superstructure. Slab-on-grade foundations are more common in warmer climates or where the soil is mostly clay. Some claim that termite issues may be less of a concern with this type of foundation, because of a lack of wood supports and empty spaces leading from the ground to the house itself. Such foundations are less expensive than elevated foundations with a crawl space or a basement.

However, slab foundations have a major disadvantage—they prevent access to the structure's environmental systems. Either the electrical wiring conduits through the slab must be water-tight, or access must be available through the attic space. Water and sewage pipes lead to disaster if they corrode or break. In some places, piping is buried under the ground below the slab and should the pipe becomes clogged or corroded an expensive excavation must take place to remove the damaged segment of the pipe.

In some areas, a problem exists where slabs settle or drop in elevation over a period of time. This problem is particularly acute in low lying areas, or in areas which have poor soil conditions. Other areas simply have a natural continuous settling of the soil, which leads to the slab foundation pressing on the pipes laid below. These pipes can settle, crack and produce explosions.

To prevent settling of pipes under slab foundations, it is desirable to affix the pipe horizontally with respect to the slab foundation so that the pipeline does not drop in elevation with respect to the slab. Conventionally, the builders use carbon steel hangers that are placed in position before the slab is poured for supporting the pipe below the slab. As the soil settles, the conventional hangers corrode and break, leaving the pipe unsupported. As a consequence, the pipes below the slab bend, crack, and deteriorate. Main sewer lines can back up causing considerable damage to the house.

To repair such broken pipes, conventional methods involve water blasting around the pipe from a street level, where the ends of the pipe are exposed. A hydro tunnel is created under the slab allowing a new pipe to be positioned under the house. The same conventional techniques are used to support the new pipe, whereby holes are punched in the slab and new supporting nails are inserted for attachment to new pipe hangers. In time, these nails will become loose, release the pipe hangers and the deterioration will start again. Needless to say this process is time consuming and expensive.

The present invention contemplates elimination of drawback associated with conventional techniques and provision of a pipe hanger assembly that can be used for suspending a pipe from an overhead support, such as for instance a concrete slab foundation.

SUMMARY OF THE INVENTION

It is, therefore, an object of the present invention to provide a pipe hanger particularly adapted for use with slab foundations.

It is another object of the invention to provide a pipe hanger that minimizes exposure of the pipe to corrosive environment.

It is a further object of the invention to provide a pipe hanger that does not rely on nails for securing the pipe hanger to the slab.

These and other objects of the invention are achieved through a provision of a pipe hanger assembly that is configured for suspending from an overhead support, such as a slab foundation. The providing a pipe hanger assembly allows for a limited horizontal and vertical positioning of a pipe engaging loop to accommodate natural position of a pipe below the slab foundation. The assembly has a pipe engaging member, and a means suspending the pipe engaging member below the slab foundation. The suspending means comprises a pair of suspension rods operationally connected to a connector plate in relation to which both rods can axially rotate. One of the suspending rods is engageable with a conical wedge member that frictionally engages a groove formed in the bottom surface of the slab.

BRIEF DESCRIPTION OF THE DRAWINGS

Reference will now be made to the drawings, wherein like parts are designated by like numerals, and wherein.

DETAIL DESCRIPTION OF THE INVENTION

Figure 1:
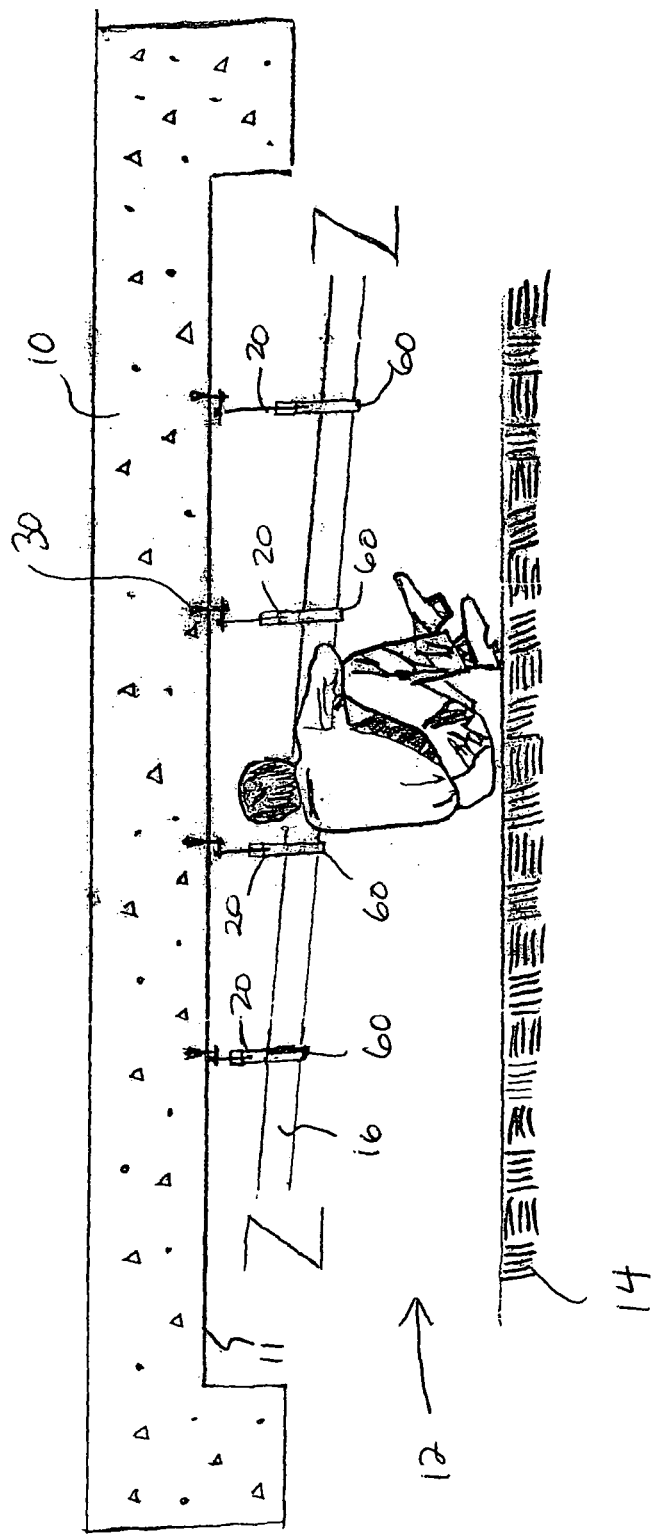
FIG. 1 is perspective view of the pipe hanger apparatus of the present invention installed below a slab foundation.
Figure 2:
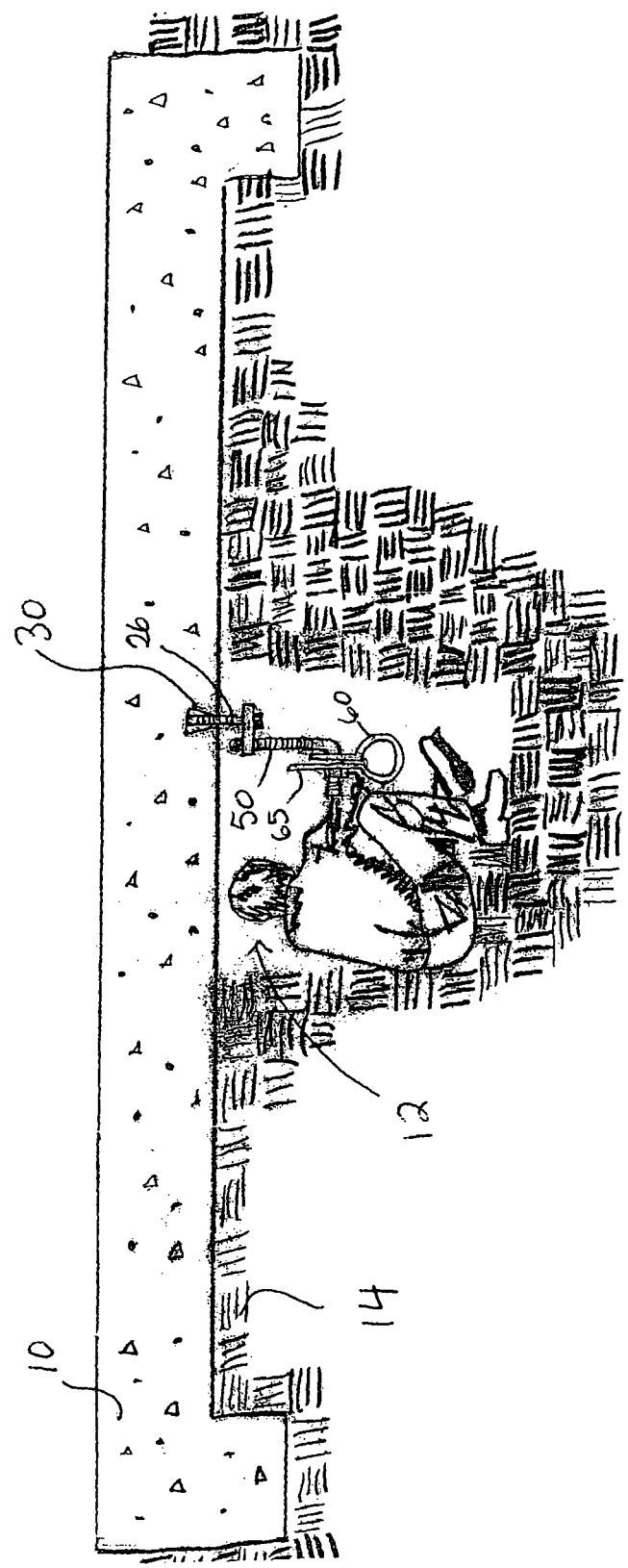
FIG. 2 illustrates the pipe hanger apparatus of the present invention installed by a worker in a tunnel below the slab foundation.

Turning now to the drawings in more detail, numeral 10 designates a slab or foundation that can be made of concrete or reinforced concrete depending on the structure. Although not shown, it is assumed that a structure, such as a house, rests on the foundation 10. An elongated trench 12 is formed in the soil 14 below the foundation 10. A pipe 16 extends within the trench 12 a distance below a bottom surface 11 of the slab 10. A plurality of grooves 18 is formed in the slab 10, with the grooves 18 extending upwardly from the bottom edge 11 of the slab 10. The grooves 18 can be punched in the slab 10 a distance from each other, for instance with an interval of about six feet. Of course, the distance between the grooves 18 can be modified depending on the weight of the pipe to be supported below the slab 10.

The pipe 16 is supported by a plurality of pipe hanger assemblies 20 according to the present invention. The hangers 20 provide support for the pipe 16 so that it does not sink with respect to the slab 10 but rather is structurally affixed thereto. Each pipe hanger assembly is suspended by a suspension means from a groove 18.

Figure 3:
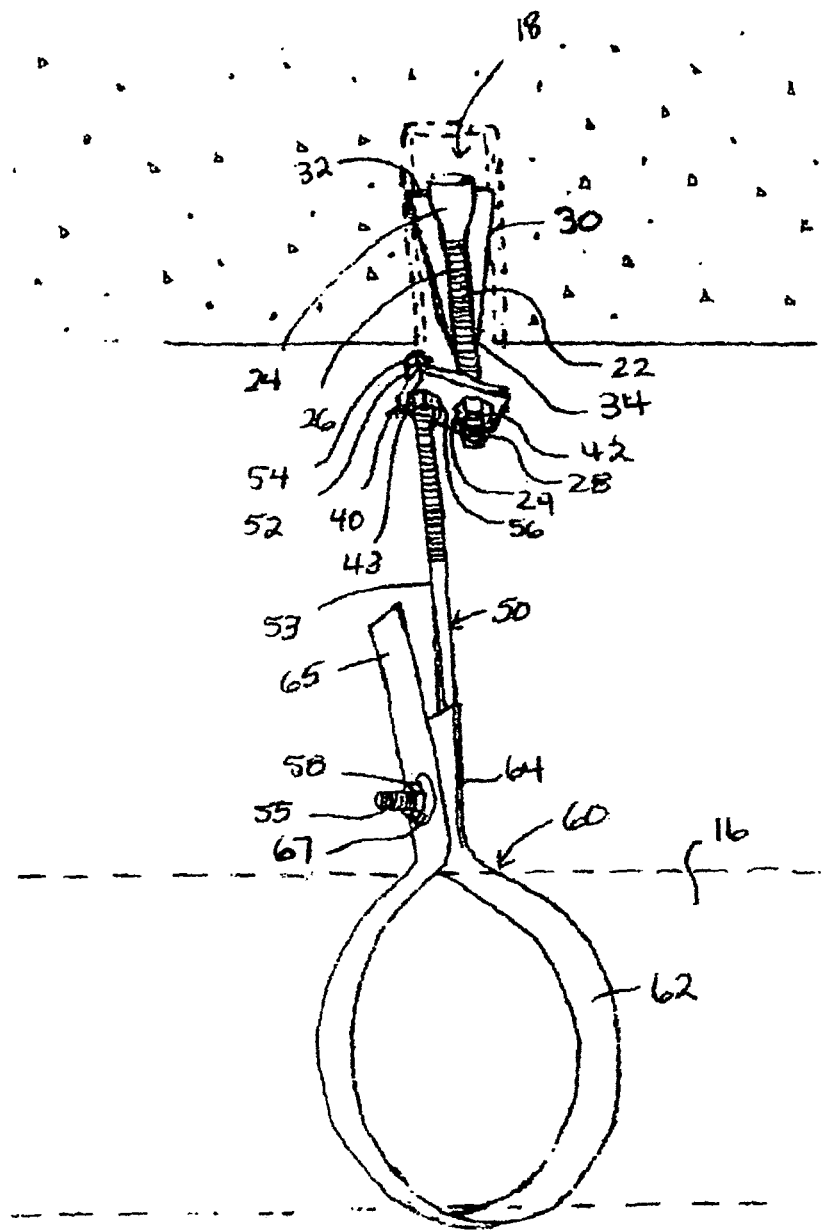
FIG. 3 is a perspective view of the pipe hanger apparatus of the present invention suspended from the slab.
Figure 4:
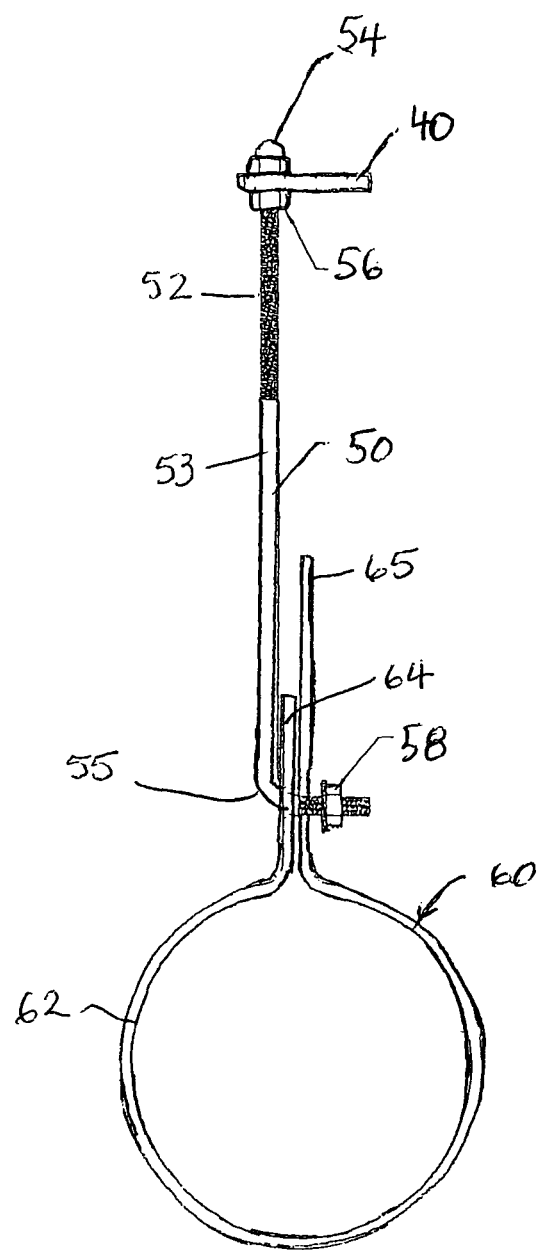
FIG. 4 is a detail side view of a portion of the pipe hanger assembly of the present invention.

FIGS. 3 and 4 illustrate in more detail the structure of the pipe hanger assembly 20. The pipe hanger assembly 20 comprises a suspension means for frictionally engaging the pipe hanger assembly with an overhead support structures, such as the slab 10. The first suspension means comprises a first suspension member 22 which is configured as an elongated rod having an upper enlarged portion 24 and a threaded shaft 26. A conical wedge member 30 is configured to receive the first suspension member therein. The wedge member 30 has a generally frustoconical configuration with an open top 32 and an open bottom, which defines an opening 34. The wedge member 30 is frictionally engaged by the walls of the groove 18, such that displacement of the wedge member 30 from the groove 18 is prevented.

The opening 34 is large enough to allow a lower part of the shaft 26 to pass therethrough. The upper portion 24 of the first suspension member has a diameter at least slightly greater than the opening 34 such that the first suspension member cannot drop from the wedge member 30.

A connector plate 40 is provided for detachable engagement with the first suspension member. The connector plate is formed with a pair of spaced apart openings 42 and 43. A lower end 28 of the threaded shaft 26 passes through the opening 42 and is freely rotatable therein about an axis of the shaft 26. A securing nut 29 engages the lower end 28 of the threaded shaft 26 on an opposite side from the wedge member 30. As will be appreciated, the position of the connector plate 40 can be changed relative to the bottom edge 11 of the slab 10 by extending the threaded shaft to a desired distance through the connector plate 40.

A J-shaped second suspension member or hanger rod 50 comprises an upper threaded part 52, a co-axially extending middle part 53, and a transversely extending lower part 55. The second suspension member 50 can be a rod having an upper and lower threaded portions. The upper part 52 is configured to engage within the second opening 43 in the connector plate 40. A cap nut 54 is threadably engaged with the upper part 52 above the plate 40, and a securing nut, which can be a hex nut 56, is engaged with the upper threaded part 52 below the connector plate 40. The second suspension member is freely rotatable in relation to the connector plate about an axis formed by the upper part 52 unless the cap nut and the securing nut are tightened after position of the pipe hanger is adjusted. At least a portion of the transverse part 55 is provided with exterior threads for engagement with a pipe engaging member 60, as will be described in more detail hereinafter.

The pipe engaging member 60 comprises an open loop 62, a first leg 64 unitary connected to the loop 62 and a second leg 65 unitary connected to the loop 62. The loop 62 has sufficient dimensions to substantially encircle exterior of the pipe 16. As can be seen in FIGS. 3 and 4, the second leg 65 is at least slightly longer than the first leg 64. The second leg 65 forms a lever for moving the pipe engaging member into a closed position around the pipe 16. The loop 62 can be of various diameters to accommodate different diameter pipes.

The first leg 64 is provided with an aperture configured for receiving the transverse lower part 55 therethrough. An aperture 67 is formed in the second leg 65 in general alignment with the aperture in the first leg 64. The outermost end of the transverse part 55 passes through the aligned apertures formed in the first leg 64 and the second leg 65 and is engaged by a securing member 58, which can be for instance a flange nut. When the securing member 58 is tightened around the threaded portion of the transverse part 55, as shown in FIG. 4, the first leg 64 and the second leg 65 are in an abutting relationship, extending substantially in parallel to each other and closing the lop 62 around the pipe 16.

In operation, a user positions the first suspension member 22 within the wedge member 30, allowing a bottom part of the first suspension member to extend through the opening 34 in the wedge member 30. The user then positions the wedge member 30 in one of the grooves 18 forcing the wedge member 30 into a tight contact with the walls of the groove 18. The lower end 28 of the first suspension member 22 is then engaged with the connector plate 40, and the nut 42 is tightened around the lower end 28.

Next, the user engages the second suspension member 50 with the connector plate 40 and secures the cap nut 54 with the upper end 52 of the second suspension member 50. The user then tightens the nut 56 below the connector plate 40, thus suspending the second suspension member from the connector plate 40. The user also positions the pipe engaging member 60 around the pipe 16 such that the first leg 64 and the second leg 65 extend upwardly from the pipe 16, while the loop 62 substantially encircles the pipe 16.

Next, the user pushes the second leg 65 into abutment with the first leg 64, thereby closing the loop 62 around the pipe 16. The transverse part 55 of the hanger rod 50 is then threaded through the apertures of the first leg 64 and the second leg 65, and the flange nut 58 is tightened around the transverse part 55. The user can then adjust the distance at which the suspension members 22 and 50 extend from the bottom surface 11 of the slab 10. As a consequence, the distance at which the pipe 16 extends from the bottom surface 11 of the slab 10 is adjusted as well. The orientation of the loop 62 can be adjusted using the free independent axial rotational engagement of the connector plate with the first suspension member and the second suspension member. Therefore, the position of the pipe engaging member can be adjusted not only vertically but also horizontally to accommodate the natural position of the pipe.

From the above discussion, it is clear that the present invention provides a hanger which can be placed in position at any time after the slab has been created. Additionally, the present invention provides a means for attaching the hanger to the concrete slab while preventing displacement of the hanger and thereby bending of the pipe supported by the hangers. The present invention also provides a hanger which allows a fully developed load carrying hanger of great structural integrity to support the pipe during repairs of the foundation and after a pour has been completed.

The pipe hanger assembly of the present invention can be formed from a variety of non-corrosive materials, for instance stainless steel. The conical wedge provides a more secure attachment of the pipe hanger to the slab than a conventional nail or screw. It is envisioned that the pipe hanger assembly of the present invention can be used in other applications for suspending a pipe from an overhead support.

Many changes and modifications can be made in the design of the present invention without departing from the spirit thereof. I, therefore, pray that my rights to the present invention be limited only by the scope of the appended claims.

We claim:

1. A method of suspending a pipe below a slab foundation, comprising the steps:

forming one or more grooves in a bottom surface of the slab foundation;

providing a pipe hanger assembly configured for frictional engagement with said groove, said pipe hanger assembly comprising a pipe engaging member, a means for suspending the pipe engaging member below the slab foundation, the suspending means comprising a conical wedge member positionable in the groove, a first elongated suspension member detachably engageable with the wedge member, and a second J-shaped suspension member operationally connected to the first suspension member, the first suspension member being configured for axial rotation in the wedge member, said suspending means facilitating limited vertical and horizontal adjustment in position of the pipe engaging member in relation to the slab foundation;

providing a connector plate mounted between the first suspension member and the second suspension member, and wherein the connector plate is rotatable about a horizontal plane and vertically adjustable relative to the slab foundation;

engaging the suspending means with the wedge member and positioning the wedge member in frictional engagement with the groove;

engaging the pipe with the pipe engaging member; and adjusting position of the pipe engaging member in relation to the slab foundation based on natural position of the pipe by rotating the suspending means relative to the slab foundation and the pipe.

2. The method of claim 1, wherein the second suspension member has an upper threaded part, a co-axially extending middle part, and a transversely extending lower part.

3. The method of claim 2, wherein the upper threaded part of the second suspension member is configured for detachable engagement with the connector plate, and the lower part is configured for detachably engagement with the pipe engaging member.

4. The method of claim 3, wherein the first suspension member comprises an elongated rod having an upper enlarged portion and a threaded shaft.

5. The method of claim 3, wherein the first suspension member and the second suspension member are configured for independent axial rotation in relation to the connector plate.

6. The method of claim 4, wherein the wedge member has an open bottom, and wherein at least a portion of the threaded shaft extends outwardly therefrom when the first suspension member is engaged with the wedge member.

7. The method of 2, wherein the pipe engaging member comprises an open loop configured to substantially encircle the pipe, a first leg unitary connected to the open loop and a second leg unitary connected to the open loop opposite the first leg, the first leg and the second leg extending upwardly from the loop.

8. The method of claim 7, wherein the first leg is provided with an aperture, a second leg is provided with an aligned aperture, and wherein the lower transversely extending part of the second suspension member is configured to extend through the aperture in the first leg and the aperture in the second leg so as to secure the pipe engaging member to the second suspension member.

9. The method of claim 7, comprising a step of providing the second leg with greater longitudinal dimensions than the first leg.

10. The method of claim 1, wherein the wedge member has a bottom opening and the step of engaging the suspending means with the wedge member comprises a step of extending the first suspension member through said opening.

11. A method of suspending a pipe below a slab foundation, comprising the steps:

forming one or more grooves in a bottom surface of the slab foundation;

providing a pipe hanger assembly configured for frictional engagement with said groove, said pipe hanger assembly comprising a pipe engaging member, a means for suspending the pipe engaging member below the slab foundation, the suspending means comprising a conical wedge member positionable in the groove, a first elongated suspension member detachably engageable with the wedge member, and a second J-shaped suspension member operationally connected to the first suspension member, the first suspension member being configured for axial rotation in the wedge member, the wedge member having a bottom opening, said suspending means facilitating limited vertical and horizontal adjustment in position of the pipe engaging member in relation to the slab foundation;

engaging the suspending means with the wedge member while extending the first suspension member through said opening and positioning the wedge member in frictional engagement with the groove;

engaging the pipe with the pipe engaging member;

adjusting position of the pipe engaging member in relation to the slab foundation based on natural position of the pipe by rotating the suspending means relative to the slab foundation and the pipe, and, wherein the first suspension member has an upper portion with a diameter at least slightly greater than the opening in the wedge member thereby preventing disengagement of the first suspension member from the wedge member.

* * * * *